(12) United States Patent
Johnston et al.

(10) Patent No.: US 12,124,326 B2
(45) Date of Patent: Oct. 22, 2024

(54) AUTOMATIC CORRELATION OF DYNAMIC SYSTEM EVENTS WITHIN COMPUTING DEVICES

(71) Applicant: Cisco Technology, Inc., San Jose, CA (US)

(72) Inventors: Jay Kemper Johnston, Raleigh, NC (US); David C. White, Jr., Durham, NC (US); Christopher Blayne Dreier, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/126,777

(22) Filed: Mar. 27, 2023

(65) Prior Publication Data
US 2023/0289255 A1    Sep. 14, 2023

Related U.S. Application Data

(63) Continuation of application No. 17/694,562, filed on Mar. 14, 2022, now Pat. No. 11,614,990, which is a
(Continued)

(51) Int. Cl.
*G06F 11/07* (2006.01)
*G06F 11/36* (2006.01)
(Continued)

(52) U.S. Cl.
CPC ............ *G06F 11/079* (2013.01); *G06F 11/07* (2013.01); *G06F 11/0709* (2013.01);
(Continued)

(58) Field of Classification Search
CPC .... G06F 11/079; G06F 11/07; G06F 11/0709; G06F 11/0751; G06F 11/0775;
(Continued)

(56) References Cited

U.S. PATENT DOCUMENTS 4,965,758 A    10/1990   Sherman
5,127,005 A    6/1992    Oda et al.
(Continued)

OTHER PUBLICATIONS

Johnston, "Office Action cited in U.S. Appl. No. 16/434,039, filed Jun. 6, 2019", mailed Jul. 8, 2019, 19 pages.
(Continued)

*Primary Examiner* — Phong H Nguyen
(74) *Attorney, Agent, or Firm* — Lee & Hayes, P.C.

(57) ABSTRACT

Systems and methods are described herein for logging system events within an electronic machine using an event log structured as a collection of tree-like cause and effect graphs. An event to be logged may be received. A new event node may be created within the event log for the received event. One or more existing event nodes within the event log may be identified as having possibly caused the received event. One or more causal links may be created within the event log between the new event node and the one or more identified existing event nodes. The new event node may be stored as an unattached root node in response to not identifying an existing event node that may have caused the received event.

20 Claims, 7 Drawing Sheets

Related U.S. Application Data continuation of application No. 16/871,757, filed on May 11, 2020, now Pat. No. 11,275,641, which is a continuation of application No. 16/434,039, filed on Jun. 6, 2019, now Pat. No. 10,649,838, which is a continuation of application No. 15/385,826, filed on Dec. 20, 2016, now Pat. No. 10,481,967, which is a continuation of application No. 14/958,134, filed on Dec. 3, 2015, now Pat. No. 9,558,196, which is a continuation of application No. 13/719,129, filed on Dec. 18, 2012, now Pat. No. 9,239,887.

(51) Int. Cl.

| | |
|---|---|
| G06F 16/17 | (2019.01) |
| G06F 16/22 | (2019.01) |
| G06F 16/2455 | (2019.01) |
| G06F 16/901 | (2019.01) |
| G06F 40/137 | (2020.01) |
| H04L 41/0631 | (2022.01) |
| H04L 41/069 | (2022.01) |
| H04L 41/22 | (2022.01) |
| H04L 45/00 | (2022.01) |

(52) U.S. Cl.
CPC ...... *G06F 11/0751* (2013.01); *G06F 11/0775* (2013.01); *G06F 11/0787* (2013.01); *G06F 11/366* (2013.01); *G06F 16/1734* (2019.01); *G06F 16/2246* (2019.01); *G06F 16/2455* (2019.01); *G06F 16/9027* (2019.01); *G06F 40/137* (2020.01); *H04L 41/0636* (2013.01); *H04L 41/069* (2013.01); *H04L 45/00* (2013.01); *H04L 41/22* (2013.01)

(58) Field of Classification Search
CPC ............... G06F 11/0787; G06F 11/366; G06F 16/1734; G06F 16/2246; G06F 16/2455; G06F 16/9027; G06F 40/137; H04L 41/0636; H04L 41/069; H04L 45/00; H04L 41/22
USPC .......................... 707/741, 797, 798; 709/224
See application file for complete search history.

(56) References Cited

U.S. PATENT DOCUMENTS

| | | | |
|---|---|---|---|
| 5,412,753 | A | 5/1995 | Alston et al. |
| 5,850,386 | A * | 12/1998 | Anderson ............... H04L 43/18 |
| | | | 714/39 |
| 5,878,385 | A | 3/1999 | Bralich et al. |
| 6,167,396 | A | 12/2000 | Lokken |
| 6,377,990 | B1 | 4/2002 | Slemmer et al. |
| 6,727,927 | B1 | 4/2004 | Dempski et al. |
| 6,735,772 | B1 | 5/2004 | MacPhail |
| 6,789,257 | B1 | 9/2004 | MacPhail |
| 7,016,955 | B2 | 3/2006 | Martin et al. |
| 7,272,587 | B1 | 9/2007 | Przytula |
| 7,275,017 | B2 | 9/2007 | Dini et al. |
| 7,373,563 | B2 | 5/2008 | Noy et al. |
| 7,380,094 | B2 | 5/2008 | Igarashi |
| 7,454,761 | B1 | 11/2008 | Roberts et al. |
| 7,483,972 | B2 | 1/2009 | Bhattacharya et al. |
| 7,631,222 | B2 | 12/2009 | Hasan et al. |
| 7,644,365 | B2 | 1/2010 | Bhattacharya et al. |
| 7,660,983 | B1 | 2/2010 | Srivastava et al. |
| 7,668,953 | B1 | 2/2010 | Sinclair et al. |
| 7,797,419 | B2 | 9/2010 | Bhattacharya et al. |
| 7,808,888 | B2 | 10/2010 | Kibel et al. |
| 7,873,717 | B1 | 1/2011 | Woolway |
| 7,930,734 | B2 | 4/2011 | Foo et al. |
| 7,999,847 | B2 | 8/2011 | Donovan et al. |
| 8,001,481 | B2 | 8/2011 | Chakra |
| 8,484,336 | B2 | 7/2013 | Meir et al. |
| 8,583,779 | B2 | 11/2013 | Meir et al. |
| 8,848,544 | B2 | 9/2014 | Bar-Tor et al. |
| 9,239,887 | B2 | 1/2016 | Johnston et al. |
| 9,485,159 | B1 | 11/2016 | Sant'Anna et al. |
| 2002/0120737 | A1 | 8/2002 | Martin et al. |
| 2003/0056140 | A1 | 3/2003 | Taylor et al. |
| 2004/0023651 | A1 | 2/2004 | Gollnick et al. |
| 2004/0078683 | A1* | 4/2004 | Buia ...................... H04L 12/66 |
| | | | 714/37 |
| 2004/0236655 | A1 | 11/2004 | Scumniotales et al. |
| 2005/0183068 | A1 | 8/2005 | Cwalina et al. |
| 2005/0210331 | A1 | 9/2005 | Connelly et al. |
| 2006/0143425 | A1* | 6/2006 | Igarashi .................. G06F 3/067 |
| | | | 711/173 |
| 2007/0028293 | A1* | 2/2007 | Boerries ............. H04L 67/1095 |
| | | | 726/2 |
| 2008/0114581 | A1* | 5/2008 | Meir ....................... H04L 41/12 |
| | | | 703/13 |
| 2008/0178025 | A1 | 7/2008 | Hand et al. |
| 2008/0195611 | A1* | 8/2008 | Chen ................... G06F 16/9024 |
| 2008/0270928 | A1 | 10/2008 | Chakra et al. |
| 2009/0002157 | A1 | 1/2009 | Donovan et al. |
| 2009/0070560 | A1 | 3/2009 | Meng et al. |
| 2009/0076983 | A1 | 3/2009 | Scumniotales et al. |
| 2009/0089252 | A1* | 4/2009 | Galitsky ............... G06F 16/245 |
| | | | 707/999.003 |
| 2009/0313638 | A1* | 12/2009 | Shetty .................. G06F 11/0709 |
| | | | 719/314 |
| 2010/0315971 | A1 | 12/2010 | Horvath et al. |
| 2011/0138291 | A1 | 6/2011 | Twiddy et al. |
| 2012/0066547 | A1* | 3/2012 | Gilbert .................... H04L 41/16 |
| | | | 714/45 |
| 2013/0204710 | A1 | 8/2013 | Boland et al. |
| 2013/0227011 | A1 | 8/2013 | Sharma et al. |
| 2014/0133358 | A1 | 5/2014 | Yin et al. |
| 2014/0172919 | A1 | 6/2014 | Johnston et al. |
| 2016/0098419 | A1 | 4/2016 | Johnston et al. |
| 2017/0102986 | A1 | 4/2017 | Johnston et al. |
| 2022/0206889 | A1 | 6/2022 | Johnston et al. |

OTHER PUBLICATIONS

Nguyen, "Final Office Action issued in U.S. Appl. No. 13/719,129, filed Dec. 18, 2012, Apr. 22, 2015", 1-13.

Nguyen, Office Action issued in U.S. Appl. No. 13/719,129, filed Dec. 18, 2012, Nov. 3, 2014, 1-11.

Final Office Action for U.S. Appl. No. 16/871,757 mailed on Dec. 14, 2020, Jay Kemper Johnston, "Automatic Correlation of Dynamic System Events Within Computing Devices", 13 pages.

Nguyen, "Final Office Action issued in U.S. Appl. No. 14/958,134, filed Dec. 3, 2015", Jun. 16, 2016, 1-19.

Nguyen, "Office Action issued in U.S. Appl. No. 15/385,826, filed Dec. 20, 2016", mailed Feb. 19, 2019, 24 pages.

Office Action for U.S. Appl. No. 16/871,757 mailed on Mar. 31, 2021, Jay Kemper Johnston, "Automatic Correlation of Dynamic System Events Within Computing Devices", 14 pages.

Office Action for U.S. Appl. No. 17/694,562, mailed May 18, 2022, Johnston, "Automatic Correlation of Dynamic System Events Within Computing Devices", 14 pages.

Office Action for U.S. Appl. No. 16/871,757 mailed on Jun. 25, 2020, Jay Kemper Johnston, "Automatic Correlation of Dynamic System Events Within Computing Devices", 9 pages.

Final Office Action for U.S. Appl. No. 16/871,757 mailed on Jul. 9, 2021, Jay Kemper Johnston, "Automatic Correlation of Dynamic System Events Within Computing Devices", 13 pages.

Office Action for U.S. Appl. No. 17/694,562, mailed Aug. 5, 2022, Johnston, "Automatic Correlation of Dynamic System Events Within Computing Devices", 17 pages.

Nguyen, "Office Action issued in co-pending U.S. Appl. No. 14/958,134, filed Dec. 3, 2015", Jan. 13, 2016, 1-27.

* cited by examiner

AUTOMATIC CORRELATION OF DYNAMIC SYSTEM EVENTS WITHIN COMPUTING DEVICES

RELATED APPLICATIONS

This application claims priority to and is a continuation of U.S. patent application Ser. No. 17/694,562, filed on Mar. 14, 2022, and entitled "Automatic Correlation of Dynamic System Events Within Computing Devices," which claims priority to and is a continuation of U.S. patent application Ser. No. 16/871,757, filed on May 11, 2020, and entitled "Automatic Correlation of Dynamic System Events Within Computing Devices," which is a continuation of and claims priority to U.S. patent application Ser. No. 16/434,039 filed Jun. 6, 2019 and entitled "Automatic Correlation of Dynamic System Events Within Computing Devices," which is a continuation of and claims priority to U.S. patent application Ser. No. 15/385,826, filed Dec. 20, 2016 and entitled "Automatic Correlation of Dynamic System Events Within Computing Devices," which is a continuation of and claims priority to U.S. patent application Ser. No. 14/958,134, filed Dec. 3, 2015 and entitled "Automatic Correlation of Dynamic System Events Within Computing Devices," which is a continuation of and claims priority to U.S. patent application Ser. No. 13/719,129 filed Dec. 18, 2012 and entitled "Automatic Correlation of Dynamic System Events Within Computing Devices." The entire contents of the above-identified priority applications are hereby fully incorporated herein by reference.

TECHNICAL FIELD

The present disclosure relates generally to system logs within electronic computing devices.

BACKGROUND

System logs are valuable tools for administrators. Examining system logs may help diagnose the cause of system problems. Manually determining which log entries relate to a given problem, however, is in general a challenging, cumbersome, and error prone endeavor.

It might take many hours to sort through hundreds, thousands, or millions of unique log entries to identify those that pertain to the issue being investigated. Once the relevant messages are identified, it requires expertise on the part of the administrator to effectively parse the logs to understand the cause and effect relationships between the records. The process often requires expertise with tools, such as text file sorting and searching programs and scripts. The process is also prone to error. If the administrator inadvertently discounts a single log entry that represents an important event relating to the problem, the conclusion of the analysis will usually be incorrect or incomplete. Administrators often fail to correlate important events that relate to a problem, leaving the diagnosis of the problem incomplete.

These system log analysis challenges tend to increase as devices become more and more complex. Some complex systems, such as network routing and switching equipment, may log thousands of unique system events. It is nearly impossible for an administrator to fully understand what each log entry indicates and how each event might be linked to one another.

DETAILED DESCRIPTION OF EXAMPLE EMBODIMENTS

Overview

The methods and systems described herein enable logging system events within an electronic machine using an event log structured as a collection of tree-like graphs. Information regarding an event to be logged may be received. A new event node may be created within the event log for the received event information. One or more existing event nodes within the event log may be identified as having possibly caused the received event. One or more causal links may be created within the event log between the new event node and the one or more identified existing event nodes. The new event node may be stored as an unattached root node in response to not identifying an existing event node that may have caused the received event.

The functionality of the various example embodiments will be explained in more detail in the following description, read in conjunction with the figures illustrating the program flow. Turning now to the drawings, in which like numerals indicate like (but not necessarily identical) elements throughout the figures, example embodiments are described in detail.

Example System Architectures

Figure 1:
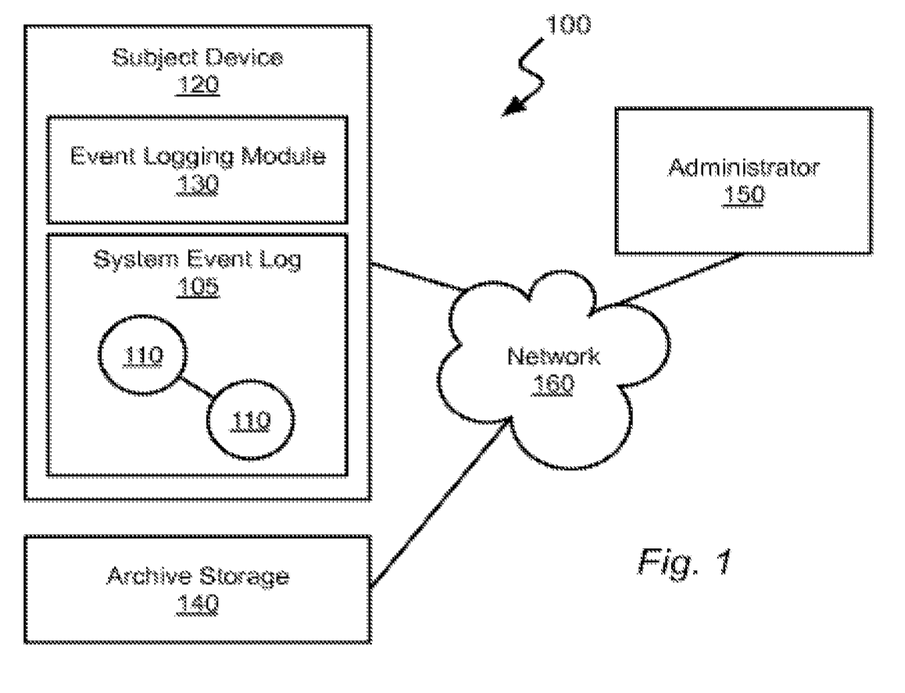
FIG. 1 is a block diagram depicting an event logging system in accordance with one or more example embodiments presented herein.

FIG. 1 is a block diagram depicting an event logging system 100 in accordance with one or more example embodiments presented herein. The event logging system 100 includes a subject device 120 where an event logging module 130 may operate to create and maintain a system event log 105. The system event log 105 can receive information about system events to be logged. Each event to be logged may be represented as an event node 110 within a tree-like structure. An administrator 150 can access the system event log 105 associated with the subject device 120. The system event log 105 may overflow to, or be backed up upon, a system for archive storage 140. The subject device 120, system for archive storage 140, and system for the administrator 150 may each be in direct communication with the others, or communication may be support by a network 160.

The methods and systems described herein may enable automatic determination of relationships among system log events generated within the subject device 120. The events may be, for example, anything occurring within, or to, the subject device 120 that may be logged into the system event log 105. Example events may include power up, power down, inputs, outputs, errors, warnings, failures, configuration changes, user actions, overflows, timeouts, and so forth. The type of events that may be logged may generally be determined by the design and operation of a given subject device 120.

Relationships among the system events may be used to generate graphical representations of the cause and effect linkages between the system events. Alternatively, the cause and effect linkages may also be represented textually. The graphical or textual cause and effect linkages may be helpful to an administrator of the computing device. Understanding a series of cause and effect system events may clarify a specific issue under investigation by the administrator.

System events and their relationship linkages may be represented as tree-like structures. The events may also be stored in tree-like data structures. Within these structures, the nodes can represent system events and the links between the nodes can represent cause and effect relationships between the nodes events. The relationships for nodes can be dynamically determined as events occur. This may be possible even where the relationships between node types are not specified in advance. The tree-like structures may be used to visualize chains of events illustrating stories of cause-and-effect events within the device or system being evaluated.

By determining and recording the cause-effect relationship between distinct system events, a device can display a history of what events led up to a specific problem within the device. Accordingly, an administrator may quickly receive indication of one or more most likely scenarios that may have led to a specific system situation. This can allow the administrator to rapidly take educated action toward system repairs or loss/failure mitigation.

The technology presented herein may be used to correlate events on a single computing device and may be used to diagnose a problem on the computing device. The tree-based structure may be used to link not just a single cause and a single event, but can capture the cause and effect relationship between many different correlated events. These complex relationship graphs can illustrate chains of events resulting in particular outcomes. A number of factors may be used to automatically determine how events may be correlated. Pre-defined correlation rules may not be required to perform the analysis. As such, the computing device may expand event logging to new types of events within the system without specifying how such new event types may relate to all existing events.

A unique approach for determining which events generally continue to cause effects downstream may be used to manage finite storage resources. The system may intelligently delete events from the log that are less likely to be a cause for an event in the future.

Various example embodiments involving network routing and switching devices as the subject device 120 may be discussed throughout this disclosure. It should be appreciated however that the subject device 120 may be any computing system or computing device where system events regarding the operation of the subject device 120 may be logged. In examples where the subject device 120 is a piece of networking equipment, logged events might be created by the subject device 120 when cables are connected or disconnected at interface ports, routing relationships are established or broken, or configuration changes are made through a management interface.

The administrator 150 may be a computing system for use by a human operator or system administrator. The administrator 150 may interface to the subject device 120 either directly or through one or more networks 160. The administrator 150 can interface with the subject device 120 through a textual interface, a graphical interface, or a combination thereof to access information associated with the system event log 105. According to one or more example embodiments, the administrator 150 may include a browser, such as a web browser, operable to display information from the subject device 120, where the subject device 120 may be operable to render hypertext, or other web-like, content to the administrator 120 for access to information associated with the system event log 105.

The archive storage 140 may comprise an external storage device such as a hard drive, non-volatile memory, optical storage, magnetic storage, solid-state storage, any other data storage technology, or any combination thereof. The archive storage 140 may be directly attached to the subject device 120 or may be a connected via a network 160 or other interface as a data storage server, database system, network attached storage ("NAS"), data backup system, or so forth. The archive storage 140 may be used to offload storage of the system event log 105, entirely or in part, from the subject device 120 in the case of an overflow of the memory or storage within the subject device 120, as a back-up mechanism, or any combination thereof.

The subject device 120, the system for archive storage 140, the system for the administrator 150, and any other computing device associated with the technology presented herein may each comprise the example embodiments of a computing machine as presented below. Furthermore, the event logging module 130 may serve as one or more modules as discussed with respect to that example computing machine, and the network 160 may serve as the various networking examples discussed with respect to that example computing machine.

In exemplary embodiments, the network 160 may include wide area networks (WAN), local area networks (LAN), intranets, the Internet, wireless access networks, wired networks, mobile networks, cellular networks, telephone networks, optical networks, or combinations thereof. The network 160 may be packet switched, circuit switched, of any topology, and may use any communication protocol. Communication links within the network 160 may involve various digital or analog communication media, such as fiber optic cables, free-space optics, waveguides, electrical conductors, wireless links, antennas, radio-frequency communications, and so forth.

Figure 2:
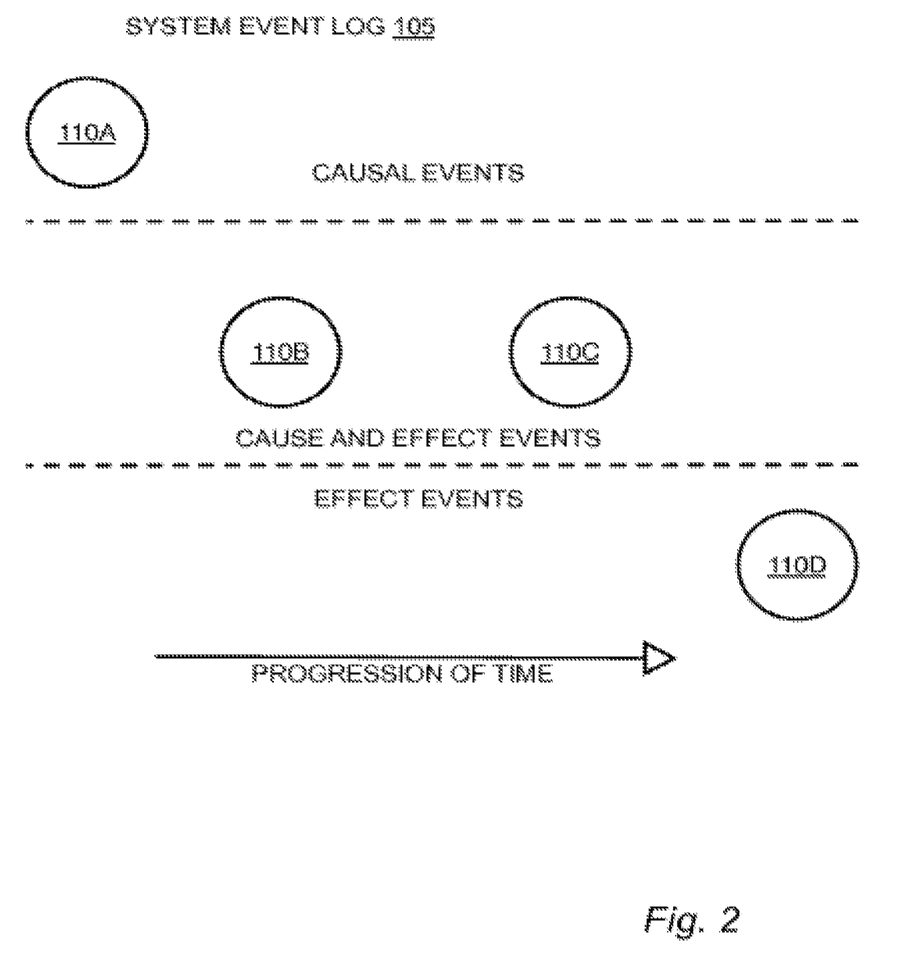
FIG. 2 is a data structure diagram depicting a system event log populated by event nodes in accordance with one or more example embodiments presented herein.

FIG. 2 is a data structure diagram depicting a system event log 105 populated by event nodes 110A-110D in accordance with one or more example embodiments presented herein. Event entries in the system event log 105 may be represented as event nodes 110A-110D. The event nodes 110A-110D may be referred to collectively or generically as event nodes 110. When a system event occurs within the subject device 120, a new event node 110 representing that specific event instance may be created within the system event log 105. Linking these event nodes 110 together according to possible cause and effect relationships may develop a tree-like graph structure where the nodes of the graph are event nodes 110 and the links of the graph are relationships.

When an event node 110 is created, the event node 110 may be flagged as one of three types. These event node types may be causal-only, cause-and-effect, and effect-only. A causal-only event node 110, such as event node 110A, can represent an event that may not be triggered by another event. The causal-only event node, such as event node 110A, can serve as the root of a tree-like graph where the nodes are event nodes 110.

A cause-and-effect event node 110, such as event nodes 1101B-110C, can represent an event that may possibly have been caused by another event or may possibly cause other events. One cause-and-effect event node may have another cause-and-effect event node as its parent. For example, event node 110C has event node 110B as its parent when both event nodes 110B and 110C are cause-and-effect event nodes.

An effect-only event node 110, such as event node 110D, can represent an event that can only be caused by another event and may not cause other events. An effect-only event node, such as event node 110D can serve as a leaf in the tree-like graph of event nodes 110.

Since causes must occur before their effects, the time ordering of event nodes 110 may be useful in establishing cause and effect relationships. A tree-like graph of event nodes 110 may generally contain events that happened at later times as the tree is traversed away from the root node towards the leaf nodes. In the illustrated example, the event nodes 110 are arranged from left to right according to the positive progression of time as shown by the time domain arrow.

In one or more example embodiments, the subject device 120 may be a network switching or routing device. In such a system, examples of causal-only event nodes, such as event node 110A, might include an interface going down, system memory being filled, a process being killed, or a power supply failing. An example of a cause-and-effect event node, such as event node 110B or 110C, may represent a specific routing table entry being removed from use. Such an event must have a cause and could also have an effect on traffic handling through the subject device 120. For example, the loss of the routing table entry may result in a packet being dropped or telnet access to the subject device 120 being denied. Such resultant events may be represented as effect-only nodes such as event node 110D.

Figure 3:
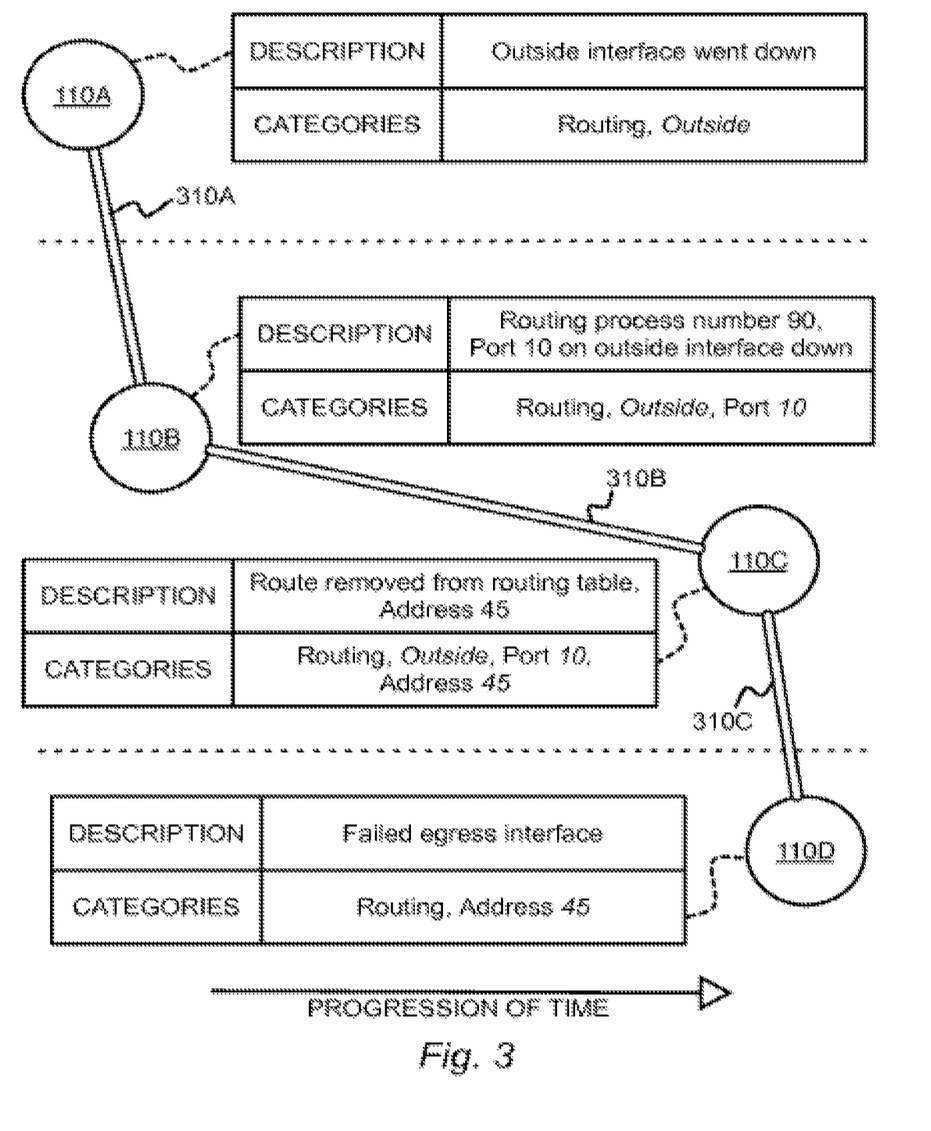
FIG. 3 is a data structure diagram depicting a tree-like graph comprising event nodes interrelated by causal linkages in accordance with one or more example embodiments presented herein.

FIG. 3 is a data structure diagram depicting a tree-like graph comprising event nodes 110A-110D interrelated by causal linkages 310A-310C in accordance with one or more example embodiments presented herein. Each event node 110 may be populated with information fields describing the specific system event that occurred. The information associated with the event node 110 can include a description of the event, categorical information associated with the event, and a timestamp of the event. These information fields may be analyzed to automatically correlate and interconnect the event nodes 110 with causal linkages 310A-310C. The causal linkages 310A-310C may be referred to collectively or generically as causal linkages 310. The causal linkages 310 can represent the cause-effect relationships between the event nodes 110. Through analysis of the information fields of the event nodes 110, the causal linkages 310 may be determined dynamically for the event nodes 110, where dynamic determination may imply that the relationships between node types may not be specified or known in advance. Instead, dynamic determination may classify the relationships on the fly as events occur and event nodes 110 are added to the system event log 105.

The information associated with an event node 110 can include a description of the event. The description may be plain human-readable text. Each instance of a given type of event may likely have the same description. Within the generic text, placeholders allow insertion of information specific to a given instance. For example, the description for event node 110B is illustrated as "Routing process number 90, Port 10 on outside interface down." The generic text includes "Routing process number [XXXX], Port [XXXX] on [XXXX] interface down." While the additional specific information includes the process number "90," the port "10," and the interface designator "outside."

The information associated with an event node 110 can include a list of categories, or categorical information about the event. The categories may be used to establish how event nodes 110 are related and thus how to link them into the tree-like graph associated with the system event log 105. In certain example embodiments, an event can have two types of categories.

The first type of categories is intrinsic categories. All events of a distinct type may have the same list of intrinsic categories. These intrinsic categories can specify the general intrinsic information about the event that took place as that information applies to every instance of that event. For example in the networking context, an event for loss of a routing peer relationship between a router and its routing peer may have the intrinsic category of "routing." When a peer relationship is lost, it may generally affect the routing capabilities of the subject device 120.

The second type of categories is contextual categories. Events may contain various contextual information entries related to the particular event. In the networking example, such contextual categorical information may include addresses, subnets, usernames, and so forth. These information entries may be dynamic and could change with each instance of the event. Such information may be useful within the list of categories to determine the linkages between event nodes 110. Contextual categories may be referred to as such because the information saved to the event may be variable as derived from the context of the particular situation in which the event occurred.

Within the categories for the illustrated example, intrinsic categories are shown in non-italicized text, while contextual categories are shown in italicized text. Also, examples of matching between the categories may be noted. The categories "routing" and "outside" are matched between event node 110A and event node 110B. The categories "routing," "outside," and "Port 10" are matched between event node 110B and event node 110C. The categories "routing" and "Address 45" are matched between event node 110C and event node 110D. Identification of these matching categories may be used as a factor for assigning correlation between event nodes 110 and thus connecting the event nodes 110 by causal linkages 310.

A timestamp may be associated with each event node 110. The timestamp may indicate the time that the event node 110 was created and thus when the associated event occurred. A second time entry may be added to each event node 110 to indicate the time of its last use. The last use indicator may be used when deleting or removing event nodes 110 from the system event log 105 as presented in additional detail below.

When an event node 110 has been created within the subject device 120, it may be determined if that event node 110 might be correlated to other event nodes 110 that have previously occurred using the subject device 120. A robust and accurate algorithm may be used for determining the correlation between event nodes 110. Three dimensions of factors may be evaluated to determine if two event nodes 110 are correlated and thus should be connected by a causal linkage 310. The three correlation factors may include time, cause/effect designations, and categories.

The first correlation factor may include timestamp evaluation. For a new event node 110 to be linked to an existing event node 110, the new event node 110 must have been created after the existing event node 110. The notion of one event occurring after another event may be indicated by the new event node 110 having a strictly later (not equal) timestamp than the existing event node 110. In the illustrated example, event node 110D has a later timestamp than event node 110C, which has a later timestamp than event node 1101B, and so on. It should be appreciated that in some embodiments granularity of the timestamp may cause two or more events to have the same timestamp even though one event occurred slightly after the other event. In such embodiments, equal timestamps may be accepted as still allowing a causal relationship.

The second correlation factor may include cause/effect designation. For example, cause-only event nodes 110 may be immediately added to the system event log 105 forming the root of a new graph. Cause-and-effect event nodes 110 and effect-only event nodes 110 may be compared against existing nodes in the system event log 105 to determine the best existing tree-like structure, if any, to attached the new event node 110.

The third correlation factor may include matching event node categories. To be considered as related, event nodes 110 may be required to share one or more categories (either contextual or intrinsic). The more categories shared to by event nodes 110, the more likely correlated they are.

It should be appreciated that two categories being shared may mean different things for different types of information. For some types of information, matching may require a proper exact match, but for other types of information, inclusion within a range or subset may suffice for matching. For example, an IP network address may be considered matched on a subnet basis. An event node 110 that contains the contextual IP subnet category "192.168.1.0/24" may be considered matched to another event node 110 having the IP subnet category of "192.168.1.4" since the two subnets overlap. If the two subnets did not overlap, the two categories would generally not be used to increase a correlation metric between the two event nodes 110.

The correlation factors may be used to establish a cause-and-effect relationship between event nodes 110. A newly created event node 110 may be compared against the other existing event nodes 110 in the system event log 105. In general, the new event node 110 may be correlated to an existing event node 110 when the new event node 110 is created after the event node 110 being compared, the new event node 110 could be a resulting effect of the event node 110 being compared, and the new event node 110 has categorical overlap with the node being compared.

When determining if event nodes 110 are correlated, several factors may be used, resulting in a range of possible results. These results may be compared to a threshold to determine if a causal linkage 310 should be created or not. According to other embodiments, a range of values for the results may be used for describing each causal linkage 310 by its correlation metric. The correlation metrics may also be referred to as probability of correlation, link likelihood, graph weights, or any other such terminology. It may be useful to display a representation of the level of correlation detected between two event nodes 110. The administrator may then take into account the confidence or likelihood of the causal linkage 310 between two event nodes 110 when interpreting the graph representations of the system event log 105.

According to one or more examples, the confidence of the causal relationship between two event nodes 110 may be visualized in a graphical representation. When the administrator clicks on an event node 110, the paths of event nodes 110 from that node to the root node may be displayed. The degree of correlation between nodes may be visualized by placing numerical values on the causal linkage 310 representations or by changing the size of the causal linkage 310 representations between the event nodes 110. According to other examples, when there are a greater number of shared categories between two event nodes 110, the causal linkage 310 between those two event nodes 110 may be rendered thicker or in different colors.

If an event node 110 being examined has more than one parent node, all possible paths to the different root event nodes may be displayed to the administrator. The administrator may employ their judgment and common sense when considering which event path of event nodes 110 could be the cause of the event they being investigated.

When an event node 110 is added to an existing tree-like graph, all event nodes 110 between the new event node 110 and the root node may have their last used indicator refreshed. Refreshing the last used indicator designates that all event nodes 110 involved in the path to the root have caused an effect event. The last used indicator may be useful when determining which event nodes 110 to delete from the system event log 105 to free up memory space.

Once the system event log 105 is populated with event trees, an administrator can browse through the different trees by clicking on parent or child event nodes 110, or optionally search through the event nodes 110 for text matches in the descriptions or categories associated with the event nodes 110. When event nodes 110 of interest are selected, the selected event node 110 may be highlighted with the information relating to that node displayed. All of the event nodes 110 between that event node 110 and the root node may also be displayed. This display can illustrate the history of the cause-effect relationship between the events related to the event nodes 110 in the tree-like graph. This event history can provide the administrator with an easy to interpret causal linkage of events that led up to the creation of the selected event node 110.

Ether a specific or dynamic amount of memory may be allocated for the system event log 105 within the subject device 120. Either way, the amount of space for the system event log 105 will generally be finite and eventually the memory for the system event log 105 may fill up as more event nodes 110 are generated over time.

The following deletion protocol may be used for efficiently removing event nodes 110 from the system event log 105. The effect-only node with the oldest last used indicator may be removed first. If no effect-only nodes remain in the system event log 105, the cause-and-effect node with the oldest last used indicator may be removed. Lastly, if neither exists, the causal-only node with the oldest last used indicator may be removed. This protocol can avoid deleting event nodes 110 that may be considered more currently relevant than other event nodes 110. When an event node 110 is added to the system event log 105, the last used indicators can be refreshed on all event nodes 110 in the path from the new event node 110 to the root event node 110. Event nodes 110 that have not been linked to in a cause-effect relationship recently may be more likely to be less important, or relevant, to this system event log 105 than event nodes 110 that were recently linked to thus having their last used indicator refreshed.

The memory space used for each event node 110 may be estimated for given characterstics of the system event log 105 and the subject device 120. The following values are example of possible memory space allocations according to one or more example embodiments. It should be appreciated that other space allocations may be used without departing from the spirit or scope of the technology presented herein. An event node 110 may fit within a block of 512 bytes comprising a description of 256 bytes, a category list of 200 bytes (40 bytes for intrinsic categories and 160 bytes for contextual categories), an event identifier of 10 bytes, up to three parent event identifiers of 30 bytes, a last used indicator timestamp of 8 bytes (resolving time since epoch in milliseconds), and an origination timestamp of 8 bytes (resolving time since epoch in milliseconds). Intrinsic categories may be placed in a table that maps a one-byte value to a specific intrinsic category. Allocating 40 bytes for intrinsic categories in each event node 110 can allow for up to forty intrinsic categories per event node 110.

Using event nodes 110 sized at 512 bytes, the system event log 105 can store 2000 events in each megabyte of memory or 2,000,000 events in each gigabyte of memory. Furthermore, event nodes 110 may be saved off to archive storage 140 to provide additional space. At the direction of the administrator, the entire event system event log 105 could be archived periodically, or individual event nodes 110 could be archived as they are deleted from the active system event log 105.

Moving event nodes 110 off to archive storage 140 may also use event nodes 110 sized at 512 bytes along with an IPv6 address for an allocation of about 1024 bytes per archived event node 110. Assuming creation of one million event nodes 110 per day, a 1 TB drive used as archive storage 140 may store approximately three years' worth of system event log 105 archives.

When several event nodes 110 are created at once, the computation effort to correlate and organize those new event nodes into tree-like graphs may tax system operations and impact performance. Delaying the computation of the cause-effect relationships and causal linkages 310 between the event nodes 110 may mitigate such impact. For example, as events occur, entries may be added to an event cache queue. A secondary process may be responsible for creating event nodes 110 for those events as well as computing the causal linkages 310 between the event nodes 110 as resources permit. This secondary process may be a lower priority process or may execute as a background operation. The secondary process may also delete or expire existing event nodes 110 as necessary.

Example System Processes

According to methods and blocks described in the example embodiments presented herein, and, in alternative embodiments, certain blocks can be performed in a different order, in parallel with one another, omitted entirely, and/or combined between different example methods, and/or certain additional blocks can be performed, without departing from the scope and spirit of the invention. Accordingly, such alternative embodiments are included in the invention described herein.

Figure 4:
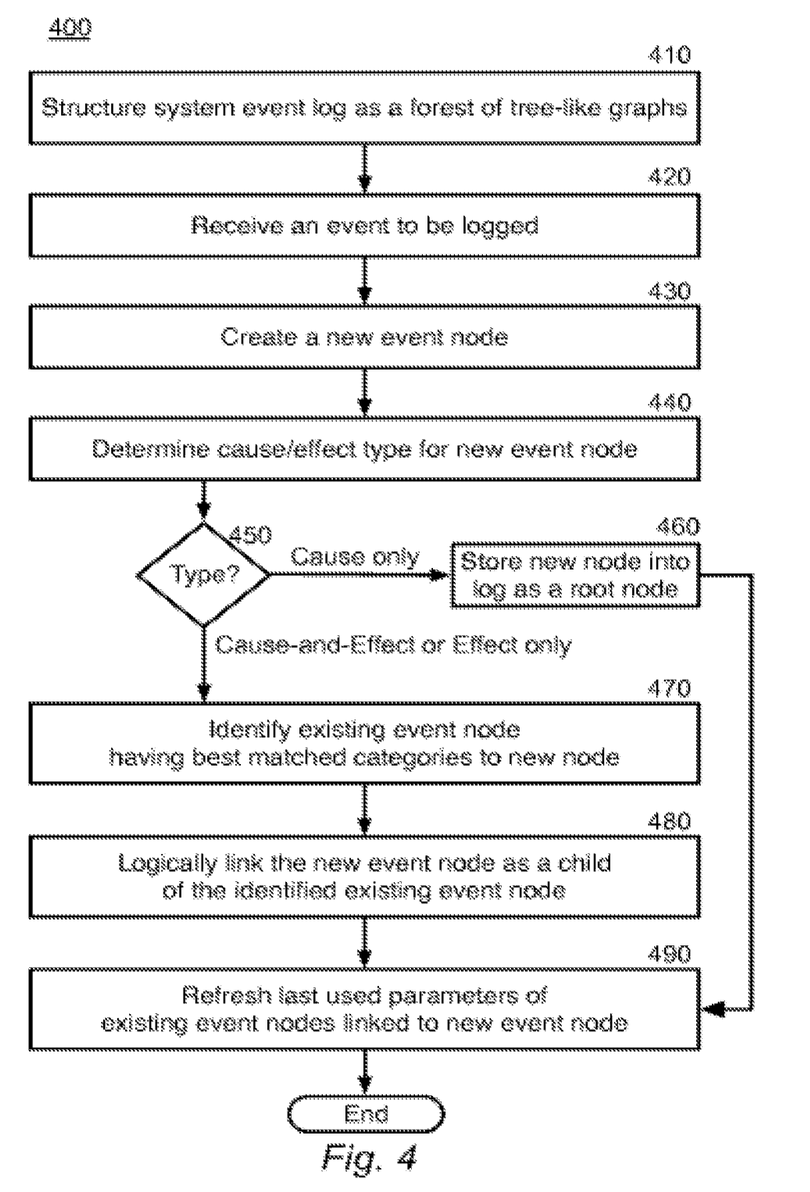
FIG. 4 is a block flow diagram depicting a method for logging events within a system event log in accordance with one or more example embodiments presented herein.

FIG. 4 is a block flow diagram depicting a method 400 for logging events within a system event log 105 in accordance with one or more example embodiments presented herein.

In block 410, a system event log 105 may be initialized by an event logging module 130 to represent system events and their relationship linkages as tree-like graphs. The events may also be stored in tree-like data structures. Within these structures, the event nodes 110 can represent system events and the links between the nodes can represent causal linkages 310 of cause and effect relationships between the event nodes 110. The relationships for nodes can be dynamically determined as events occur. The tree-like structures may be used to visualize chains of events illustrating histories of cause-and-effect events within the subject device 120 being evaluated. Two or more tree-like graphs may be collectively referred to as a forest of tree-like graphs.

In block 420, the event logging module 130 may receive information regarding an event to be logged within the system event log 105. Events may be logged without pre-defined correlation of events or event types. Accordingly, the subject device 120 may expand event logging to new types of events within the subject device 120 without specifying how such new event types may relate to previous existing events.

In block 430, the event logging module 130 may create a new event node 110 associated with the event received in block 420. The event node 110 may include various informational fields. For example, a description field may include plain human-readable text representing a description of the event. Similarly, one or more category fields may include a list of categories, or categorical information about the event. A first type of categories may include intrinsic categories. All events of a distinct type may have the same list of intrinsic categories. These intrinsic categories can specify the general intrinsic information about the event that took place as that information applies to every instance of that type of event. A second type of categories may include contextual information that can vary as derived from the context of the particular situation in which the event occurred.

Another example field associated with the event node 110 may include a time stamp indicating the time that the event node 110 was created and thus when the associated event occurred. A second time entry may be added to each event node 110 to indicate the time of its last use or association with a newly added event.

Yet another example field associated with the event node 110 may include an event identifier. The event identifier may be useful to uniquely identifying an event node 110. Event identifiers may be numbers or other values and may be allocated sequentially, randomly, borrowed from a pool, or so forth. The identifiers may also be memory locations or pointers of the associated event node 110 or associated data. The event identifier may be used to uniquely record the causal linkages 310 of the event nodes 110 by storing a list, within each event node 110, of event identifiers that are associated with parents and/or children of the event node 110 as determined by the tree-like cause and effect structure.

As a new event node 110 is being created, storage requirements within the system event log 105 may require deleting an existing event note 110 to free space for the newly created event node 110. The amount of space for the system event log 105 will generally be finite and eventually the memory for the system event log 105 may fill up as more event nodes 110 are generated over time. A deletion protocol may be used for efficiently removing event nodes 110 from the system event log 105.

In block 440, the event logging module 130 may determine a cause/effect type for new event node 110 created in block 430. Each event node 110 may be flagged as one of three types. These event node types may be causal-only, cause-and-effect, and effect-only. A causal-only event node 110 can represent an event that may not be triggered by another event and may serve as the root of a tree-like graph where the nodes are event nodes 110. A cause-and-effect event node 110 can represent an event that may possibly have been caused by another event or may possibly cause other events. An effect-only event node 110 can represent an event that can only be caused by another event and may not cause other events.

In block 450, the event logging module 130 may determine if the new event node 110 created in block 430 is a causal-only type. If it is determined in block 450 that the new event node 110 is a causal-only type, the method 400 may continue to block 460. In block 460, the event logging module 130 may store new node cause-only event node 110 into the system event log 105 as an unassociated root node of a new tree-like graph. After block 460, the method 400 may continue to block 490 discussed below.

If instead, it is determined in block 450 that the new event node 110 is not a causal-only type, the method 400 may continue to block 470. In block 470, the event logging module 130 may identify an existing event node 110 within the system event log 105 having the best matched categories to the new event node 110 created in block 430. Through analysis of the information fields of the event nodes 110, the causal linkages 310 may be determined dynamically for the event nodes 110. Dynamic determination may classify the relationships on the fly as events occur and event nodes 110 are added to the system event log 105. The events may be logged without pre-defined correlation. A robust and accurate algorithm may be used for determining the correlation between event nodes 110. Correlation factors may be evaluated to determine if two event nodes 110 are correlated and thus should be connected by a causal linkage 310. The correlation factors may include time, cause/effect designations, and categories, for example.

To limit computational complexity and improve time performance, a maximum time window may be specified that may pass between two events for them to be considered related, thus reducing the number of existing event nodes 110 that need to be investigated as a potential cause for the newly created event node. For example, only existing event nodes in the system event log 105 that are less than a certain amount of time old may need to be evaluated. According to some example embodiments, that amount of time may be three minutes. Three minutes is an example time window; any duration of window may be specified for evaluation according to various embodiments. Also, the duration of the examination window may be dynamic based upon various system parameters such as frequency of events, number of events, processor loading, and so forth.

In block 480, the event logging module 130 may logically link the new event node as a child of the identified existing event node from block 470. The logical link may be marked using event identifiers that uniquely identify each event node 110. The event identifier may be used to uniquely record the causal linkages 310 of the event nodes 110 by storing a list, within each event node 110, of event identifiers that are associated with parents and/or children of the event node 110 as determined by the tree-like cause and effect structure.

When it was not determined exactly which previous event caused the current event, or when it appears that more than one previous event may have contributed to the current event, the new event node 110 may be linked to multiple parent events nodes 110. A limit or maximum may be specified for the number of multiple linkages according to various embodiments. For example, a maximum may be set such that the new event node 110 may be linked to, at most, three (or some other number) possible parent event nodes 110. Because there could be more than the maximum number of potential causal events found for the new event, there may be an algorithm defined to find the best potential causes for the new event. The time difference between a cause and effect may be a strong indicator of correlation especially in conjunction with at least one matching intrinsic category. As such, those causes that have a matching intrinsic category that occurred closest in time to the effect event may be selected and linked as the best potential causes of the new event.

In block 490 the event logging module 130 may refresh the last used timestamp parameters of that existing event nodes linked to new event node. When an event node 110 is added to an existing tree-like graph, all event nodes 110 between the new event node 110 and the root node may have their last used indicator refreshed. Refreshing the last used indicator designates that all event nodes 110 involved in the path to the root have a causal role in the new event.

After block 490, the method 400 ends. Of course logging events within a system event log 105 may continue according to repeated application of method 400

Figure 5:
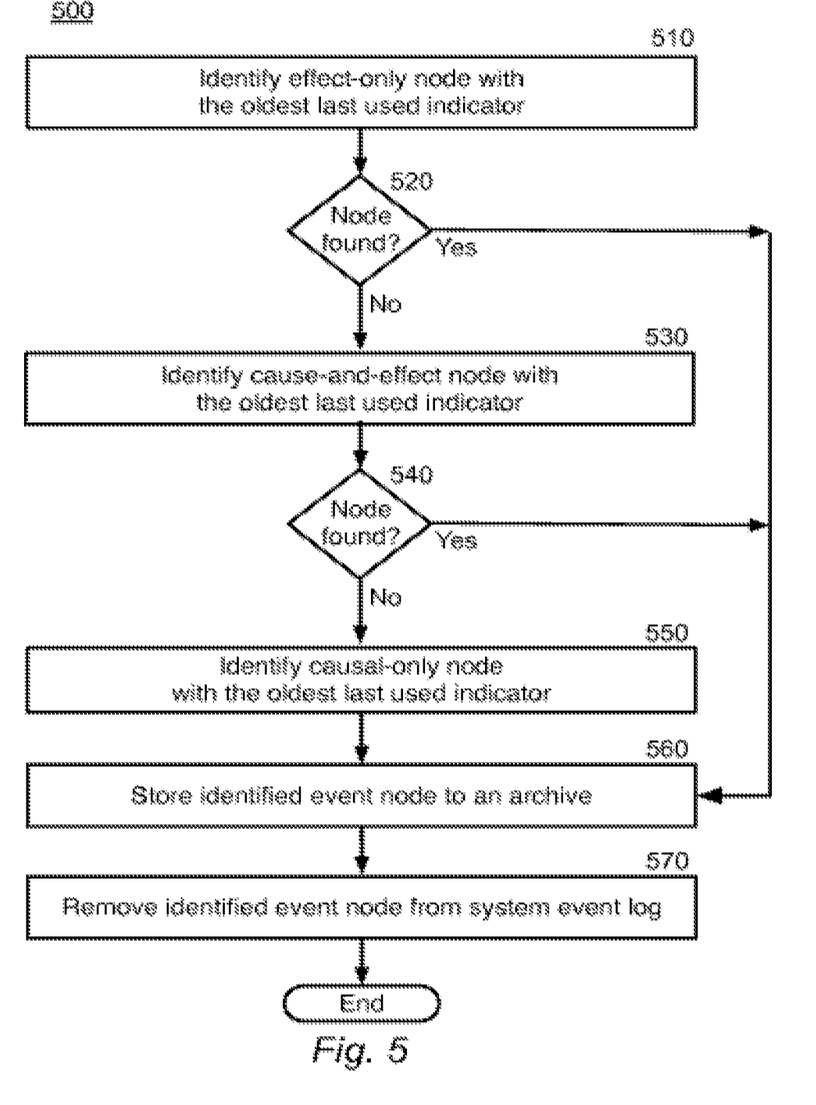
FIG. 5 is a block flow diagram depicting a method for deleting an event node from a system event log in accordance with one or more example embodiments presented herein.

FIG. 5 is a block flow diagram depicting a method 500 for deleting an event node 110 from a system event log 105 in accordance with one or more example embodiments presented herein. Among other example embodiments, event node deletion may comprise a two-phase age-out mechanism. In a first phase, all effect-only event nodes that are not attached to any parent nodes 110 may be removed starting first with those event nodes 110 having the oldest last use timestamp. In a second phase, remaining effect-only event nodes may be removed starting first with those nodes having the oldest last use timestamp. In the second phase, any identified effect-only node will have at least one parent node. All such parent nodes having the same last-update timestamp as the identified effect-only node may also be removed. These parent nodes include all those up the chain to, and including, the root node.

This means, if the oldest effect-only node in the tree has one parent (a cause-effect node), and that has only one parent (a cause-only node—which is also a root node), then they would all have the same last-updated timestamp, and all three would be removed at the same time.

In block 510, the event logging module 130 can identify the effect-only node within the system event log 105 having the oldest last used indicator and no parent nodes. If an effect-only node without parents is not identified, then the effect-only node with the oldest last used indicator may be identified. In certain exemplary embodiments, all effect-only nodes without parent nodes can be identified before any effect-only nodes without parent nodes.

In block 520, it can be determined if an effect-only node was identified in block 510. If an effect-only node was identified in block 510, the method 500 may continue to block 560. If however, an effect-only node was not identified in block 510, the method 500 may continue to block 530.

In block 530, the event logging module 130 can identify the cause-and-effect node with the oldest last used indicator and no parent nodes. If a cause-and-effect node without parents is not identified, then the cause-and-effect node with the oldest last used indicator may be identified. In certain exemplary embodiments, all cause-and-effect nodes without parent nodes can be identified prior to identifying any cause-and-effect nodes with parent nodes.

In block 540, it can be determined if a cause-and-effect node was identified in block 530. If a cause-and-effect node was identified in block 530, the method 500 may continue to block 560. If however, a cause-and-effect node was not identified in block 530, the method 500 may continue to block 550.

In block 550, the event logging module 130 can identify the causal-only node with the oldest last used indicator. Through block 510-550, the least recently used effect-only node may be identified (giving preference, in certain example embodiments, to those without parent nodes). If no effect-only nodes remain in the system event log 105, the least recently used cause-and-effect node may be identified (giving preference, in certain example embodiments, to those without parent nodes). Lastly, if neither exists, the least recently used causal-only node may be identified for removal. This example protocol can avoid deleting event nodes 110 that may be considered more currently relevant than other event nodes 110. When an event node 110 is added to the system event log 105, the last used indicators can be refreshed on all event nodes 110 in the path from the new event node 110 to the root event node 110. Event nodes 110 that have not been linked in a cause-effect relationship recently may be more likely to be less important, or relevant, to this system event log 105 than event nodes 110 that were recently linked to, thus having their last used indicator refreshed.

In block 560, the event logging module 130 may store to an archive any event nodes 110 that have been identified for removal to an archive. In addition to the event node identified for removal in previous steps, any of that event node's parent nodes (all the way up to and including the root) may also be identified for removal if they have same last use timestamp of the identified event node. Where such a chain of event nodes has been identified for removal, each of those event nodes may first be stored to an archive. The archive storage 140 may be used to offload storage of the system event log 105, entirely or in part, from the subject device 120 in the case of an overflow of the memory or storage within the subject device 120, as a back-up mechanism, or any combination thereof. Event nodes may be saved off to archive storage 140 to provide additional space within the system event log 105.

In block 570, the event logging module 130 can remove the identified event node 110 from the system event log 105. In addition to the event node identified for removal in previous steps, any of that event node's parent nodes (all the way up to and including the root) may also be removed if they have same last use timestamp of the identified event node. Removing the identified event node 110 may include disconnecting any causal linkages 310 between the identified event node 110 and other event nodes 110. Removing the identified event node 110 may include freeing or releasing memory, structures, or objects associated with the identified event node 110.

After block 570, the method 500 ends. Of course deleting event nodes 110 from a system event log 105 may be continued through repeated application of method 500.

Figure 6:
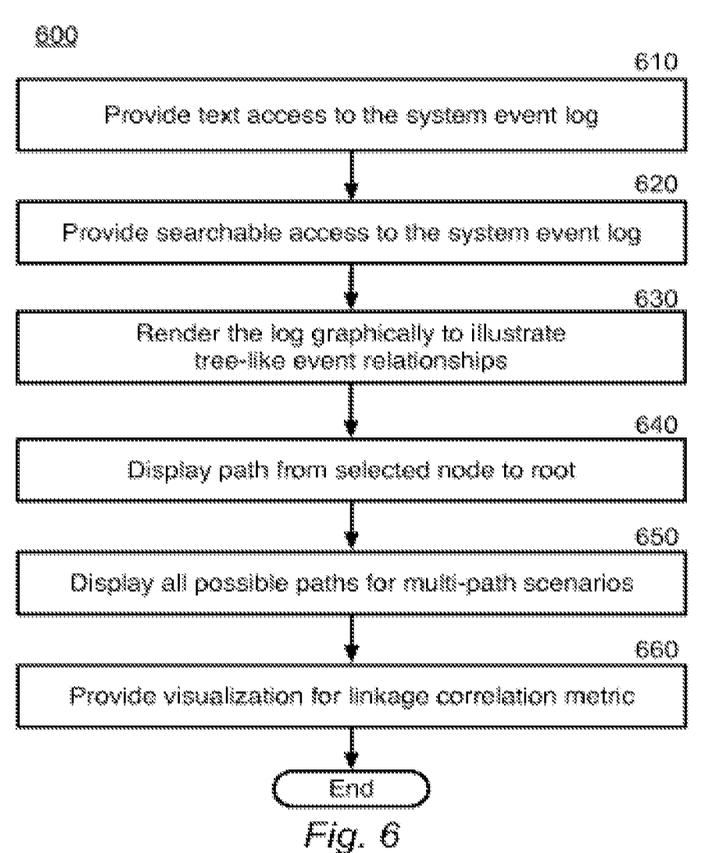
FIG. 6 is a block flow diagram depicting a method for providing user interface to a system event log in accordance with one or more example embodiments presented herein.

FIG. 6 is a block flow diagram depicting a method 600 for providing a user interface to a system event log 105 in accordance with one or more example embodiments presented herein.

In block 610, the event logging module 130 can provide a textual user interface to the system event log 105. An administrator may access the system event log 105 using a command line, terminal, or other such interface. The event logging module 130 can generate a textual representation of the relevant system event nodes 110. The text event node messages that are generated may be appended with textual information that represents the cause and effect relationship path of the causal linkages 310 between the nodes. For example, each text event nodes 110 may be appended with one or more unique identifier values indicating the event's identifier, and the identifiers indicating the parent events. The parent event identifiers may be indicated in descending order of cause-effect confidence (as determined by the number of overlapping categories). The administrator could read back in time through the text representation of the events to see the cause and effect linkage between the events.

In block 620, the event logging module 130 can provide searchable access to the system event log 105. The search can bring up event nodes 110 and their associated causal linkages 310. The search may be done on various key words or characteristics from the system event log 105. The search may be performed for the textual access from block 610 or the return a graphical rendering of a tree portion.

In block 630, the event logging module 130 can render the system event log 105 (or a portion of it) graphically to illustrate tree-like event relationships. A portion of the system event log 105 may be provided in response to the search performed in block 620. An administrator can browse through the tree-like structures of the system event log 105 by clicking on parent or child event nodes 110. Also, the administrator can search through the event nodes 110 for text matches in the descriptions or categories associated with the event nodes 110. When event nodes 110 of interest are selected, that event node 110 may be highlighted and also annotated with the information relating to that event node 110.

In block 640, the event logging module 130 can display a path from a selected event node 110 to a root event node 110. The event nodes 110 between the selected event node 110 and the root node may also be displayed as a tree-like graph. This display can tell the story of the cause-effect relationship between the events related to the event nodes 110 in the tree-like graph. This story can provide the administrator with an easy to interpret history of events that led up to the creation of the selected event node 110.

In block 650, the event logging module 130 can display all possible paths for multi-path scenarios. Because there may be more than one parent event nodes 110 associated with each node, multiple possible cause-effect trees may be displayed.

In block 660, the event logging module 130 can provide visualization for linkage correlation metric. The visual display of the tree-like structures may be annotated with text describing the correlation metric or probability for each causal linkage 310. Also, the causal linkages 310 may be color coded or rendered in different sizes to show their relative correlation metric values.

After block 660, the method 600 ends. Though, providing user interface functionality to the system event log 105 may be continued through repeated application of method 600.

Example Systems

Figure 7:
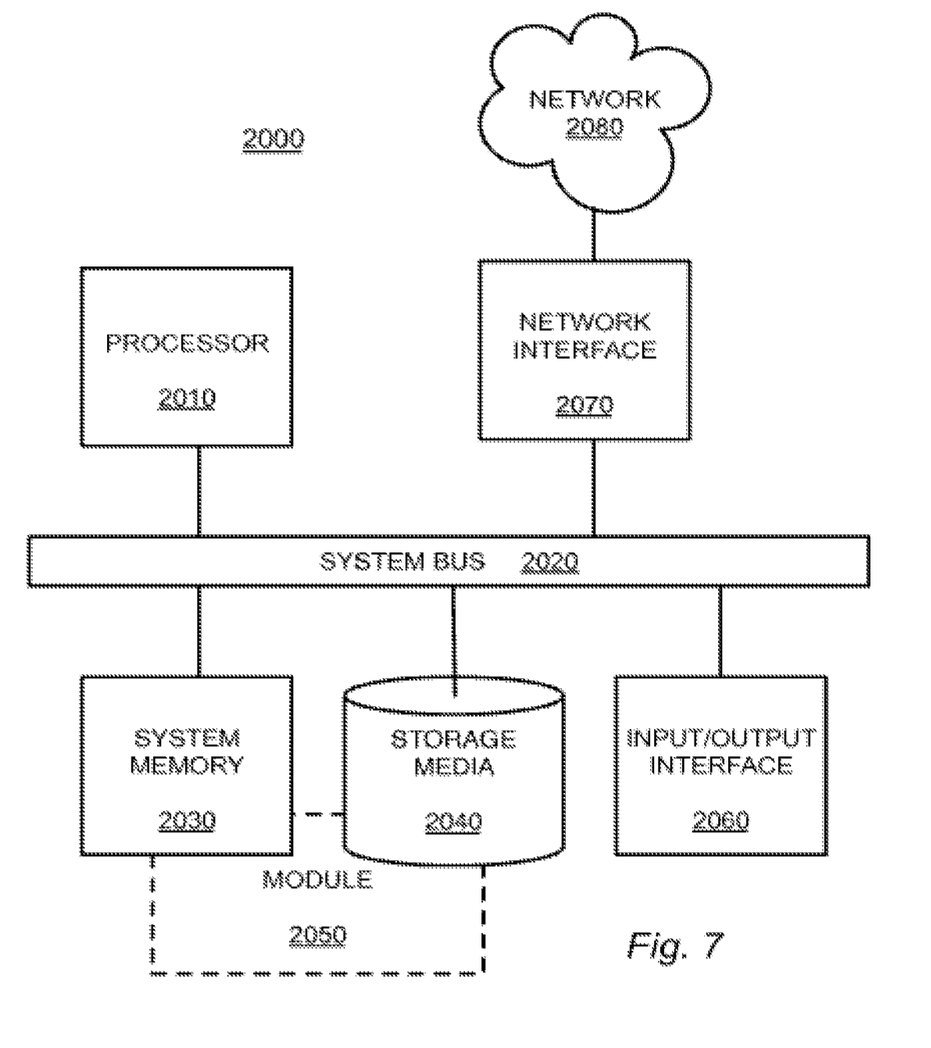
FIG. 7 is a block diagram depicting a computing machine and a module in accordance with one or more example embodiments presented herein.

FIG. 7 depicts a computing machine 2000 and a module 2050 in accordance with one or more example embodiments presented herein. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 also may include volatile memories, such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

One or more aspects of the example embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the example embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of embodiments of the invention. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method for correlating events in a network, the method comprising:
    receiving a plurality of events at a network-connected administrator machine, each event coming from a subject device and being indicative of a problem;
    storing the plurality of events in a storage device associated with the network-connected administrator machine;
    correlating a subset of the plurality of events, to create a set of correlated events;
    identifying a causal-only node included in the set of correlated events;
    updating a last used indicator associated with the causal-only node in response to creating the set of correlated events;
    identifying an event node within an event log storing the set of correlated events having an oldest last used indicator;
    removing the event node from the event log based at least in part on the event node having the oldest last used indicator;
    identifying an effect-only node within the event log storing the set of correlated events having a next oldest last used indicator;
    storing, to an archive, the effect-only node; and
    removing the effect-only node from the event log.

2. The computer-implemented method of claim 1, further comprising:
    identifying a cause-and-effect node within the event log storing the set of correlated events having a next oldest last used indicator;
    storing, to the archive, the cause-and-effect node; and
    removing the cause-and-effect node from the event log.

3. The computer-implemented method of claim 1, further comprising:
- displaying, via a graphical user interface, information from the set of correlated events, a description of one or more events from the set of correlated events, and an identified cause of the problem; and
- displaying, via the graphical user interface, information from the set of correlated events as a temporally and causally-related log.

4. The computer-implemented method of claim 1, wherein the method further comprises:
- at each subject device, receiving a set of network packets, the set of network packets including characteristics indicative of an event;
- correlating the set of network packets to identify at least one characteristic associated with the event;
- creating an event including the at least one characteristic; and
- sending a copy of the event to the network-connected administrator machine.

5. The computer-implemented method of claim 1, wherein at least two events of the plurality of events are associated with a category.

6. The computer-implemented method of claim 5, wherein the events having a same category type are correlated together.

7. The computer-implemented method of claim 1, wherein one or more events are correlated based on a username.

8. The computer-implemented method of claim 1, further comprising receiving a click on a rendering of the problem, and responsive to the click, rendering a portion of events correlated to the problem via the graphical user interface.

9. A system for identification of errors affecting a network, the system comprising:
- one or more processors; and
- one or more non-transitory computer-readable media storing computer-executable instructions that, when executed by the one or more processors, cause the one or more processors to perform operations comprising:
  - receiving a plurality of events at a network-connected administrator machine, each event coming from a subject device and being indicative of a problem;
  - storing the plurality of events in a storage device associated with the network-connected administrator machine;
  - correlating a subset of the plurality of events, to create a set of correlated events;
  - identifying at least one of an effect-only node or a cause-and-effect node included in the set of correlated events;
  - updating a last used indicator associated with the at least one of the effect-only node or the cause-and-effect node in response to creating the set of correlated events;
  - identifying an event node within an event log storing the set of correlated events having an oldest last used indicator;
  - removing the event node from the event log based at least in part on the event node having the oldest last used indicator;
  - identifying a cause-and-effect node within the event log storing the set of correlated events having a next oldest last used indicator;
  - storing, to an archive, the cause-and-effect node; and
  - removing the cause-and-effect node from the event log.

10. The system of claim 9, further comprising:
- identifying an effect-only node within the event log storing the set of correlated events having a next oldest last used indicator;
- storing, to the archive, the effect-only node; and
- removing the effect-only node from the event log.

11. The system of claim 9, further comprising:
- identifying a causal-only node within the event log storing the set of correlated events having a next oldest last used indicator and no parent nodes;
- storing, to the archive, the causal-only node; and
- removing the causal-only node from the event log.

12. The system of claim 9, wherein the operations further comprise:
- at each subject device, receiving a set of network packets, the set of network packets including characteristics indicative of an event;
- correlating the set of network packets to identify at least one characteristic associated with the event;
- creating an event including the at least one characteristic; and
- sending a copy of the event to the network-connected administrator machine.

13. A computer-implemented method for correlating events in a network, the method comprising:
- receiving a plurality of events at a network-connected administrator machine, each event coming from a subject device and being indicative of a problem;
- storing the plurality of events in a storage device associated with the network-connected administrator machine;
- correlating a subset of the plurality of events, to create a set of correlated events;
- identifying a first causal event that associated with an effect event included in the set of correlated events and is associated with first information;
- identifying a second causal event associated with the effect event included in the set of correlated events and is associated with second information;
- determining that the first causal event is a true cause of the effect event based on a comparison of the first information to effect event information and a comparison of the second information to the effect event information;
- at each subject device, receiving a set of network packets, the set of network packets including characteristics indicative of an event;
- correlating the set of network packets to identify at least one characteristic associated with the event;
- creating an event including the at least one characteristic; and
- sending a copy of the event to the network-connected administrator machine.

14. The computer-implemented method of claim 13, wherein at least one of the first information, the second information, or the effect event information comprise categorical information associated with at least one of the first causal event, the second causal event, or the effect event.

15. The computer-implemented method of claim 13, wherein the comparison of the first information to the effect event information and the comparison of the second information to the effect event information includes determining a first number of overlapping categories between the first information and the effect event information and a second number of overlapping categories between the second information and the effect event information.

16. The computer-implemented method of claim 13, further comprising:

displaying, via a graphical user interface, information from the set of correlated events, a description of one or more events from the set of correlated events, and an identified cause of the problem; and displaying, via the graphical user interface, information from the set of correlated events as a temporally and causally-related.

17. The computer-implemented method of claim 16, further comprising receiving a click on a rendering of the problem, and responsive to the click, rendering a portion of events correlated to the problem via the graphical user interface.

18. The computer-implemented method of claim 13, further comprising determining a line thickness or a line color to represent the information based at least in part on determining a first number of overlapping categories between the first information and the effect event information and a second number of overlapping categories between the second information and the effect event information.

19. The computer-implemented method of claim 13, wherein at least two events of the plurality of events are associated with a category.

20. The computer-implemented method of claim 19, wherein the events having a same category type are correlated together.

* * * * *